3,258,347
EDIBLE PHARMACEUTICAL INKS
James Carroll Brown, Osceola, Ind., assignor to Miles Laboratories, Inc., Elkhart, Ind., a corporation of Indiana
Filed Aug. 19, 1963, Ser. No. 303,149
6 Claims. (Cl. 106—30)

This invention relates to the production of certain ink compositions suitable for marking pharmaceutical tablets. More specifically, the invention is directed to shellac-based ink compositions particularly suitable for printing of ink indicia on pharmaceutical tablets having a wax-coated medicinal core and to a process for utilizing said ink compositions.

The importance of providing pharmaceutical tablets with a clearly visible identifying marking to prevent spurious imitations and substitutions is well illustrated by the significant volume of business which has been lost by some manufacturers because of such imitations and substitutions.

For purposes of this invention the coated medicinal core is defined as a medicinal core covered with successive undercoats, smoothing coats, and suitably colored finish coats. The smoothing and finishing coats consist primarily of grossing powders and coating syrups to give the tablet a smooth outer surface which is designated in the pharmaceutical art as a sugar coating.

Frequently, the printing of ink indicia on a sugar-coated tablet is accomplished by applying a confectioner's shellac coating over the sugar coating and then imprinting on the shellac coating with an ink having a shellac base. Due to the presence of shellac in both the ink and the coat the ink adheres tenaciously to the coat to product an acceptable product. However, the nature of the shellac surface is considered undesirable by many pharmaceutical manufacturers in view of its lack of polish or luster. In addition, because of the tackiness of the shellac coating it tends to stick to the wall of the coating pan during the coating process and to pull off the sugar coating around the medicinal core. Also, the tacky character of shellac-coated tablets presents a handling problem. For example, such tablets do not readily flow into and do not readily seat properly in accommodating recesses in the printing machine.

In an effort to combat the aforementioned difficulties many manufacturers have considered it desirable to apply a wax coating, for example of carnauba wax, to each tablet, such coating being capable of taking on a high polish. In this manner the tablet is provide with a very desirable free-sliding or flowing character, and the desired pharmaceutical elegance is imparted to the tablet. However, the wax coating has not proved entirely satisfactory in that conventional shellac-based inks will not readily adhere to the waxy surface and the markings have a tendency to rub off even after drying on the waxed surface.

The only prior art ink composition of which I am aware that is used to imprint indicia on a waxed sugar coated tablet is exemplified in U.S. Patent No. 2,982,234 to Ackley and Kane. In this reference the patentees utilize an ink composition comprising a major amount of confectioner's shellac mixed with selected quantities of ethyl alcohol and water-white butyl alcohol, substantial amounts of cyclohexane and ammonia and the usual conventional color pigments and dyes.

In the aforementioned composition the cyclohexane and ammonia are utilized to penetrate the wax layer of the tablet so that the ink composition can adhere to the surface of the sugar coating thereunder rather than to the wax layer. Moreover, the use of butyl alcohol in an edible composition, such as the ink compositions of this invention, is not considered desirable because of the toxic properties of this compound.

Accordingly, it is a primary object of the present invention to provide a shellac-based ink composition which does not have the disadvantages of the prior art compositions.

Another object of this invention is to provide a shellac-based ink composition containing ingredients approved for use in an edible food composition.

Still another object of this invention is to provide a shellac-based ink composition which will effectively adhere to a waxed sugar coated pharmaceutical tablet to give a clear and legible marking which cannot be easily obliterated.

Yet another object of this invention is to provide a shellac-based ink composition suitable for imprinting on a wax-coated pharmaceutical tablet and a process for applying an ink indicia to said wax-coated tablet.

The ink compositions of the present invention consist essentially of a purified shellac, referred to as confectioner's glaze, mixed with ethyl alcohol, propylene glycol and various selected conventional dyes and pigments as necessary to provide the color ink desired.

The inventive concept resides in the unexpected discovery that a shellac-based ink composition containing a critical amount of propylene glycol in relation to the shellac provides an excellent ink base for imprinting of ink indicia on a pharmaceutical tablet having a wax-coated medicinal core. Although the mechanism by which the ink compositions of this invention bond to the waxy surface of the tablet is not completely understood, it is theorized that the proylene glycol serves primarily to control the evaporation rate of the ink. In other words, because of the relatively high boiling point of propylene glycol, it inhibits or retards evaporation of the highly volatile ethyl alcohol solvent of the present ink compositions. Controlling the evaporation rate of ink printed on a wax-coated tablet is a critical factor in that if the ink evaporates too rapidly it will not become impregnated into the wax layer and, conversely, if the ink evaporates too slowly the wet ink will "offset" onto other objects which the tablet contacts during the printing operation.

The use of propylene glycol to control the evaporation of a shellac-based ink composition produces a surprising and unexpected result because propylene glycol does not volatilize or evaporate during the printing operation and will thus remain in the ink composition. Since the propylene glycol does remain in the ink composition one skilled in the art would expect it to prevent the ink from "setting up" or drying properly, but instead, it apparently acts as a very effective control against too rapid evaporation of the ethyl alcohol solvent, without interfering with drying of the ink.

To obtain marked tablets having a pharmaceutically elegant appearance the process of marking the tablets is very exacting. Generally, the process involves feeding the tablets through a rotary drum mechanism which deposits the tablets into cups or recesses on a moving belt. While the tablets are thus carried, the desired marking or printing is applied by a transfer roller which deposits the ink by an offset process. The tablets move with the belt and are subsequently dropped into a collection container.

In the practice of this invention it is preferred that approximately 1.6 seconds elapse between the imprinting and the deposition of the tablets in the collection container. During this period of time sufficient hardening of the imprint or brand must occur so that tablets will not smudge or spot one another upon contact in the collection container. It is found that the use of a critical amount of propylene glycol in the ink composition of this invention produces an excellent permanent, non-offsetting ink imprint within the requisite drying time. Experience has shown that when the drying time is too slow, spotting or smudging of the tablets occurs in the collection container. On the other hand, when the drying time is too fast, transfer of the ink to the tablets is insufficient, and further, the ink tends to clog the engraving and transfer rollers. To provide ink compositions having the requisite drying characteristics necessary to provide the unexpectedly superior marking aforementioned, it was found that the use of propylene glycol in an amount sufficient to give a propylene glycol/shellac weight ratio, based on dry weight of the shellac, of from about 0.2 to about 0.7 and preferably from about 0.3 to about 0.66, is required.

Because of the inherent tackiness or stickiness of shellac, when used as a base in pharmaceutical printing inks, it is essential to control the evaporation rate of the alcohol solvent in the alcohol-shellac mixture to obtain optimum transfer of the ink composition from the engraving and transfer rollers to the tablets.

The point at which the ink compositions of this invention will most effectively transfer from the roller to the tablet is designated as the "set-to-touch-time" for the inks. The "set-to-touch-time" for the present ink compositions is determined in a manner similar to a standard procedure used by the American Society for Testing of Materials in testing shellac varnish. Such a procedure is described in "Tentative Methods of Sampling and Testing Shellac Varnish," ASTM Designation: D1650–59T, ASTM Standards 1961, part 8, p. 436, procedure 12(a) to 12(c). For purposes of this invention the present ink compositions are applied to a glass plate in horizontal position with an applicator which applies the compositions as wet films of approximately 0.002 inch thickness. Approximately every 30 seconds the ink test films are lightly touched with the tip of the finger and are considered "set-to-touch" when the ink still shows a tacky condition but none of it adheres to the finger. The "set-to-touch-time" of the present ink compositions which was found to give the optimum transfer characteristics was from about 2 minutes to 4 minutes after application of the ink film to the glass plate.

The inking process of this invention is preferably conducted at temperatures between about 68° F. and 72° F. and in a humidity range of from about 45% to 55%.

After the ink indicia has set, which usually requires a period of about 8 hours, the tablets are transferred to conventional polishing pans where they are provided with a protective outer coating of a suitable transparent material such as, for example, a mixture of carauba wax and beeswax in a suitable solvent. The marking, being of a different color than the color of the coatings thereunder, is clearly visible through the transparent outer coating which serves to protect the tablets against chipping and flaking under normal handling conditions.

The following examples will serve to illustrate ink compositions prepared according to the present invention, it being understood that these examples are not to be construed in a limitative sense. In the ink compositions of these examples the individual ingredients in each formulation are specified in percentages by weight based on the total weight of the composition.

EXAMPLE I

White ink

| Formulation: | Percent |
|---|---|
| Shellac (purified) (dry basis) | 20.0 |
| Ethyl alcohol (200 proof anhydrous) | 34.2 |
| Titanium dioxide (U.S.P.) | 41.8 |
| Propylene glycol (U.S.P.) | 4.0 |
| | 100.0 |

The propylene glycol/shellac weight ratio of this composition is about 0.20, based on the dry weight of shellac.

EXAMPLE II

White ink

| Formulation: | Percent |
|---|---|
| Shellac (purified) (dry basis) | 19.6 |
| Ethyl alcohol (200 proof anhydrous) | 33.4 |
| Titanium dioxide (U.S.P.) | 41.0 |
| Propylene glycol (U.S.P.) | 6.0 |
| | 100.0 |

The propylene glycol/shellac weight ratio of this composition is about 0.306, based on the dry weight of shellac.

PREPARATION OF INK COMPOSITION

The entire weight of pigment was weighed and deposited into a suitable container. About one-half the total amount of confectioner's shellac was added to form a high viscosity liquid and the pigment-shellac mixture was then mixed under high shear by an air driven mixer to break up large agglomerations of pigment. Following the pre-mixing step, the balance of confectioner's shellac (about one-half the total amount) and the propylene glycol was added to reduce the viscosity sufficiently to permit efficient grinding in a ball mill. The resulting mixture was ground in a ball mill for from about 4 hours to 8 hours to assure a uniform mixture of the shellac-pigment product and to reduce agglomerate size. The finished ink composition was then placed in suitable containers for storage until used.

EXAMPLE III

Red ink

The following ink composition was prepared according to the method of Example I.

| Formulation: | Percent |
|---|---|
| Shellac (purified) (dry basis) | 22.5 |
| Ethyl alcohol (200 proof anhydrous) | 38.5 |
| Red lake color (FD & C Red No. 4) | 24.0 |
| Propylene glycol (U.S.P.) | 15.0 |
| | 100.0 |

The propylene glycol/shellac weight ratio of this composition is about 0.666, based on the dry weight of shellac.

EXAMPLE IV

Red ink

The following ink composition was prepared according to the method of Example I.

| Formulation: | Percent |
|---|---|
| Shellac (purified) (dry basis) | 24.4 |
| Ethyl alcohol (200 proof anhydrous) | 41.6 |
| Red lake color (FD & C Red No. 4) | 26.0 |
| Propylene glycol (U.S.P.) | 8.0 |
| | 100.0 |

The propylene glycol/shellac weight ratio of this composition is about 0.328, based on the dry weight of shellac.

EXAMPLE V

Black ink

The following composition was prepared according to the method of Example I.

Formulation:                                           Percent
- Shellac (purified) (dry basis) ------------ 14.5
- Ethyl alcohol (200 proof anhydrous) ------ 25.5
- Bone black (N.F. IX purified animal charcoal) --------------------------- 55.0
- Propylene glycol (U.S.P.) ---------------- 5.0

100.0

The propylene glycol/shellac weight ratio of this composition is about 0.335, based on the dry weight of shellac.

Although the present examples are directed to the preparation of white, red and black inks utilizing titanium dioxide, red lake color and bone black as the preferred pigments and dyes, it is understood that any of the commercially available dyes and pigments which have been approved for use in edible food compositions can be successfully utilized in the present invention to produce ink compositions of any of a variety of colors, such as for example, red, green, blue, orange, lavender, and light brown.

The confectioners' shellac-alcohol mixture employed in the ink compositions of this invention is a commercially available solution designated as a "4 pound cut," which consists of 4 pounds of shellac per gallon of alcohol. The shellac composition is preferably a purified shellac which is free of arsenic and lead. The ethyl alcohol solvent is a U.S.P. grade of substantially pure ethyl alcohol containing either a relatively small proportion of non-toxic denaturant or no denaturant at all.

Similarly, the propylene glycol and the color lakes and pigments of the present ink compositions are non-toxic products of a purity commensurate with the alcohol and shellac ingredients of the present compositions. In other words, all of the ingredients in the ink compositions of the present invention are non-toxic products approved by the U.S. Food and Drug Administration as fit for human consumption.

In summary, the present invention concerns the preparation of novel shellac-based ink compositions which are particularly suited for printing of indicia on pharmaceutical tablets having a wax-coated medicinal core. The inventive concept resides in the discovery that shellac-based inks containing propylene glycol in a critical ratio to the amount of shellac in the compositions, provide ink compositions having excellent printing characteristics with respect to wax-coated pharmaceutical tablets. Propylene glycol is incorporated in the present ink composition in an amount sufficient to give a propylene glycol/shellac weight ratio, based on the dry weight of the shellac, of from about 0.2 to about 0.7, and preferably from about 0.3 to about 0.66.

What is claimed is:

1. An edible ink composition for applying indicia to a wax-coated pharmaceutical tablet comprising purified shellac, ethyl alcohol, propylene glycol, and a coloring substance selected from pigments and lakes, wherein the propylene glycol/shellac weight ratio is in the range of from about 0.2 to 0.7, based on the dry weight of the shellac.

2. An ink composition according to claim 1 wherein the coloring substance is selected from the group consisting of titanium dioxide, bone black and red lake color.

3. An edible ink composition for applying ink indicia to a wax-coated pharmaceutical tablet comprising purified shellac, ethyl alcohol, propylene glycol and a coloring substance selected from pigments and lakes, wherein the propylene glycol/shellac weight ratio is in the range of from about 0.3 to 0.66, based on the dry weight of the shellac.

4. An edible ink composition for applying indicia to a wax-coated pharmaceutical tablet comprising from about 14.5% to 24.4% purified shellac, from about 25.5% to 41.6% ethyl alcohol, from about 4% to 15% propylene glycol and from about 24.0% to 55% of a coloring substance selected from pigments and lakes, wherein the propylene glycol/shellac weight ratio is in the range of from about 0.2 to 0.7 based on the dry weight of the shellac.

5. An edible ink composition for applying indicia to a wax-coated pharmaceutical tablet comprising from about 14.5% to 24.4% purified shellac, from about 25.5% to 41.6% ethyl alcohol, from about 4% to 15% propylene glycol and from about 24.0% to 55% of a coloring substance selected from pigments and lakes, wherein the propylene glycol/shellac weight ratio is in the range of from about 0.3 to 0.66, based on the dry weight of the shellac.

6. An ink composition according to claim 5 wherein the coloring substance is selected from the group consisting of titanium dioxide, bone black and red lake color.

References Cited by the Examiner

UNITED STATES PATENTS

| | | | |
|---|---|---|---|
| 2,404,680 | 7/1946 | Aneshansel | 106—30 |
| 2,948,626 | 8/1960 | Sanders | 106—30 XR |

FOREIGN PATENTS 161,973  3/1955  Australia.

ALEXANDER H. BRODMERKEL, *Primary Examiner.*

LESLIE H. GASTON, *Examiner.*

J. B. EVANS, *Assistant Examiner.*